United States Patent [19]

Schaefer

[11] Patent Number: 4,955,451
[45] Date of Patent: Sep. 11, 1990

[54] UTILITY VEHICLE

[76] Inventor: Stephen H. Schaefer, 1728 Missouri St., San Diego, Calif. 92109

[21] Appl. No.: 259,273

[22] Filed: Oct. 17, 1988

[51] Int. Cl.⁵ .................. B62D 61/08; B60K 17/00
[52] U.S. Cl. ............................... 180/213; 180/252; 180/305; 180/307; 280/DIG. 5
[58] Field of Search ............... 180/213, 252, 242, 908, 180/305, 307, 308; 280/DIG. 5

[56] References Cited

U.S. PATENT DOCUMENTS

| | | | |
|---|---|---|---|
| 1,306,483 | 6/1919 | Hino | 180/213 |
| 3,433,318 | 3/1969 | Packard | 180/213 |
| 3,827,528 | 8/1974 | Shaffer | 180/253 |
| 4,399,886 | 8/1983 | Pollman | 180/242 X |

FOREIGN PATENT DOCUMENTS

| | | | |
|---|---|---|---|
| 486283 | 9/1952 | Canada | 180/213 |
| 1362606 | 4/1964 | France | 180/213 |
| 2469339 | 5/1981 | France | 180/213 |

Primary Examiner—Charles A. Marmor
Assistant Examiner—Tamara L. Finlay
Attorney, Agent, or Firm—Baker, Maxham, Jester & Meador

[57] ABSTRACT

A three-wheel utility vehicle employing a power head with a hydraulic motor and having power wheel suspension. A trailer is connected to the power head and has a large capacity and low bed and is pivotably coupled to the one-wheeled power head. A gasoline engine drives a two-stage, variable displacement pump which is controlled by a directional valve, to drive a reversible hydraulic motor coupled to the front drive wheel. The power head includes a hydraulic braking system.

5 Claims, 3 Drawing Sheets

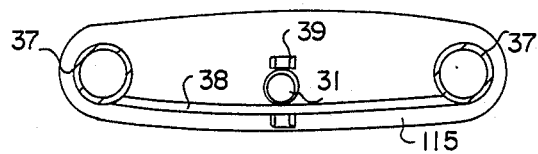
FIG. 3
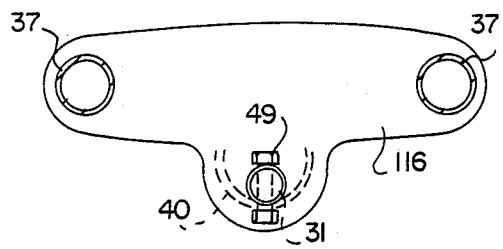
FIG. 4
FIG. 8
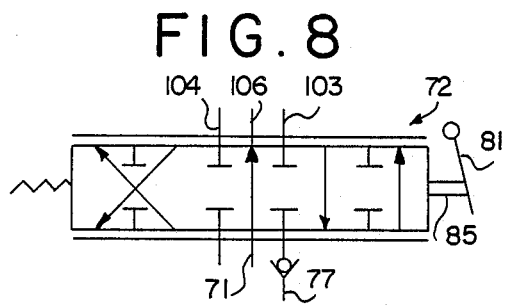
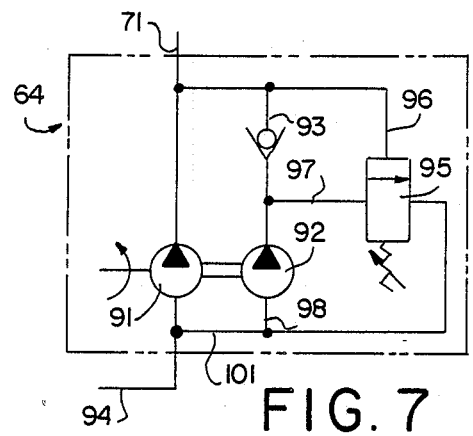
FIG. 7
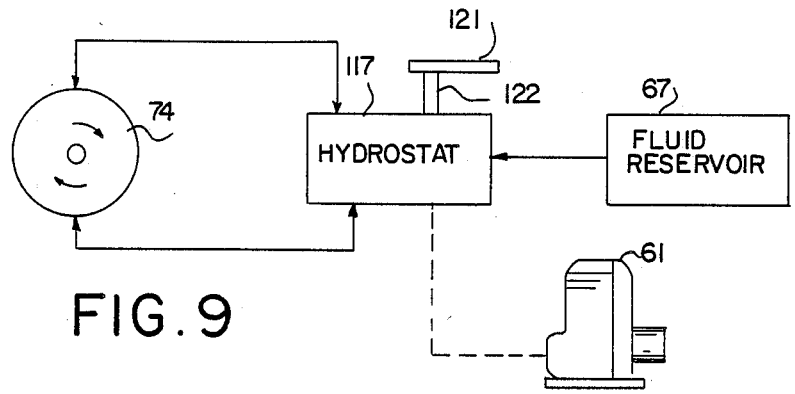
FIG. 9

UTILITY VEHICLE

FIELD OF THE INVENTION

This invention relates generally to utility vehicles and more particularly to a cost effective three-wheel utility vehicle with a low, large capacity bed and a power head with high torque, variable speed and front wheel suspension.

BACKGROUND OF THE INVENTION

Small three- and four-wheel utility vehicles have widespread use in connection with maintaining golf courses, estates, parks, theme parks and the like. Their primary functions are to transport personnel and equipment between the maintenance yard and shop and various locations on the grounds. Some of the equipment may be relatively easily handled, such as hoses, directional signs, tools and horticultural plantings. However, some items may be relatively heavy and bulky, including lawn mowers such as those used for golf course greens. For this reason, it is desirable to have a low bed so that it is easy to lift the equipment into the vehicle bed or to run it in up a shallow ramp.

Many currently available utility vehicles employ an engine with a power train to the rear wheels. Because power is transmitted to the rear wheels, the container bed must be relatively high and thereby it is somewhat difficult to use, requiring significant lifting in many instances. This has led to the configuration of some utility vehicles having front wheel drive. Such drive is normally provided from a gasoline engine by means of belts or chains to the front wheel. Because of this configuration, there is no suspension in these front wheel drive vehicles. This provides a very harsh ride for the vehicle operator and riders and significant shock to the vehicle and equipment, thereby causing failure of parts well before their normal times. It should be realized that these vehicles typically move over terrain that is not a paved path so it is primarily uneven and, depending upon speed, can be very bumpy.

Because of the requirement for orientation of the engine with respect to the front drive wheel, the exhaust has often been located at the operator's shoulder level so that the exhaust fumes tend to be in the operator's face, thereby causing considerable danger and discomfort.

Another characteristic of these direct driven gasoline powered engines is that they employ a single speed fixed ratio power source, possibly with a double reduction through belts and chains. When high resistance is encountered, such as moving uphill with a heavy load, the only method of obtaining high wheel torque is by "slipping" the clutch or the drive belt on the pulley wheel by the operator. This practice may propel the vehicle up the hill but it leads to high friction heat which causes extreme belt fatigue, thereby resulting in belt failure because of the burning of the belt material. Alternatively, if "slipping" is not performed, the engine, having a relatively high ratio, will be "lugged down," and be unable to maintain the necessary torque so that stalling will often result.

With respect to suspension, because of the use of the chain or belt drive, front wheel suspension would be very difficult. Further, with a typical configuration of this type, two bearings and a chain must be removed in order to remove or replace the wheel in case of damage to the tire.

Braking in some of the prior art vehicles is accomplished through a mechanical lever handle which in turn moves a lever with two V-shaped braking pads attached. These braking pads are forced in a pulley "V" attached to an intermediate shaft, or jackshaft. This friction slows and stops the jackshaft which in turn slows and stops the chain driving the wheel. If the chain should happen to jump off the sprockets, there is no braking at all and the vehicle is left in a free-wheeling condition, with possible catastrophic results.

SUMMARY OF THE INVENTION

It is a purpose of this invention to provide a relatively low cost, efficient, high capacity, low-to-the-ground bed utility vehicle with front wheel suspension, variable speed and torque and a relatively fail-safe braking arrangement with several distinct advantages which will become apparent from the detailed description.

The power head of the vehicle is pivotally connected to the trailer portion, the trailer being the low bed container body. An engine, typically a gasoline powered engine, is mounted to the power head in such a way that the exhaust is directed away from the operator. The engine drives a variable displacement pump which is connected between a fluid reservoir and a directional valve. The directional valve is in turn connected between the pump and the hydraulic wheel motor which is mounted to the front wheel. The connections between the directional valve and the front wheel are through flexible, high pressure hoses which permits the front wheel to be mounted to the power head by a suspension means to thereby provide a smoother ride for the vehicle and the riders.

As an alternative embodiment, the vehicle may employ a variable displacement piston pump or hydrostat which replaces the variable displacement pump and directional valve of the preferred embodiment.

BRIEF DESCRIPTION OF THE DRAWING

The objects, advantages and features of the invention will be more clearly perceived from the following detailed description when read in conjunction with the accompanying drawing, in which:

FIG. 3 is a fragmentary sectional view taken along cutting plane 3—3 in FIG. 2;

FIG. 4 is a fragmentary sectional view taken along cutting plane 4—4 in FIG. 2;

FIG. 7 is a schematic view of the hydraulic pump shown in FIG. 6;

FIG. 8 is a schematic view of the directional valve of FIG. 6; and

FIG. 9 is a schematic view of an alternative embodiment of the power head portion of the invention.

DETAILED DESCRIPTION OF THE PREFERRED EMBODIMENTS

Figure 1:
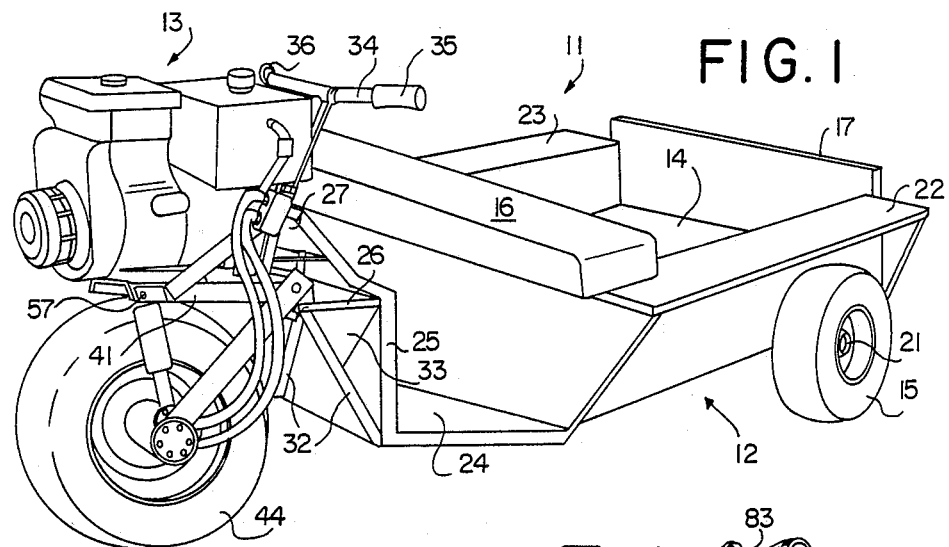
FIG. 1 is a perspective view of a utility vehicle constructed in accordance with the invention.
Figure 2:
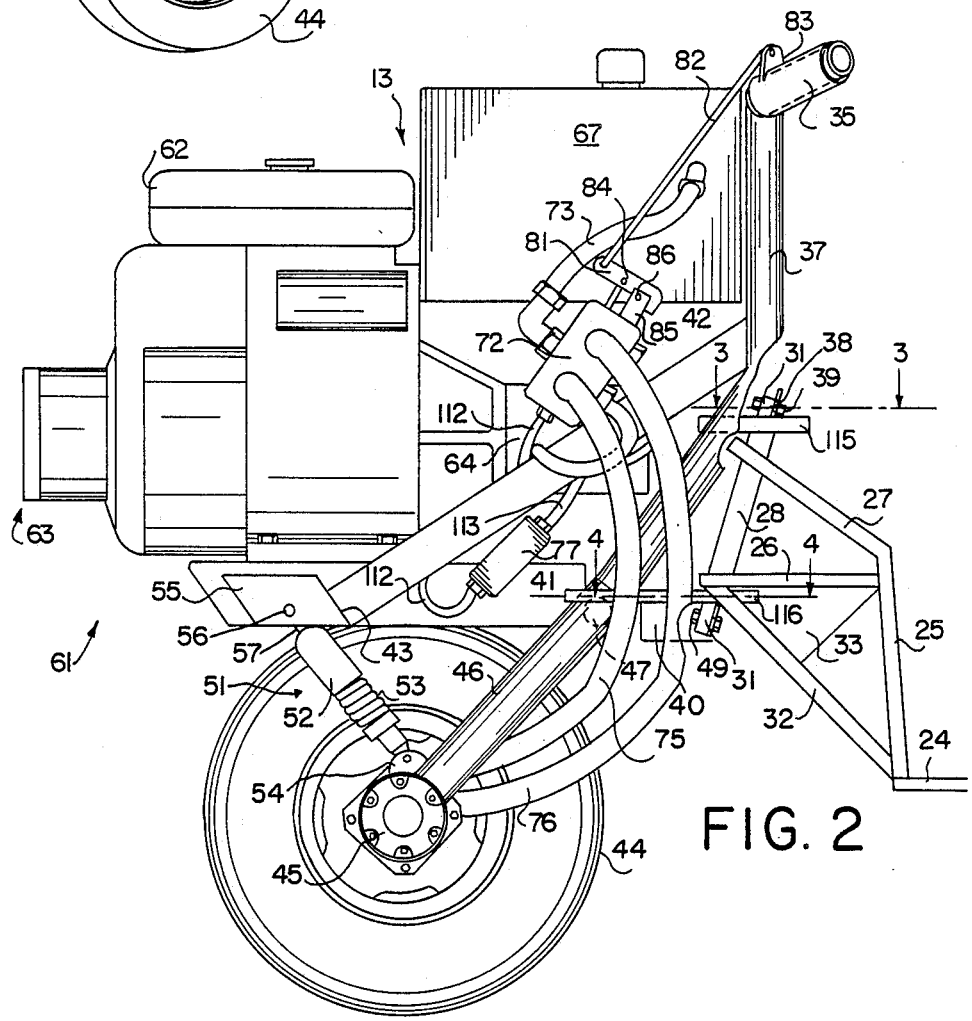
FIG. 2 is a side view of the power head portion of the invention of FIG. 1.

With respect to the drawing, and more particularly to FIGS. 1 and 2 thereof, there is shown utility vehicle 11, comprised of trailer portion 12 and power head 13. The trailer portion includes a container bed body 14 riding on wheels 15, only one of which is shown. A seat 16 is provided on which the operator and possibly other passengers may ride. Tailgate 17 is provided to enclose the openable rear portion of the bed. In order to make the bed ride as close as possible to the ground, wheels 15 are preferably mounted to stub axles 21 which are positioned at or above the level of the base of the bed. This provides that the surface of the bed will be as low as possible to the ground. Tailgate 17 may be long enough to provide a ramp for driving heavy equipment such as lawn mowers into and out of the bed. In any event, sides 22 and 23, while allowing the bed to hold a substantial amount of equipment, are relatively low and result in as little back stress as possible for lifting items into and out of the bed.

The forward portion of trailer 12 comprises footrest 24 and bulkhead 25. Projecting forwardly from bulkhead 25 are lower mounting plate 26 and upper mounting plate 27. Tubular element or neck 28 includes internal bushings extending between plates 26 and 27. A detachable pivot or lynch pin 31 extends through neck 28 between plates 115 and 116 thereby pivotally securing trailer portion 12 to power head 13. Bracing rods 32 and plates 33 provide extra strength for lower plate 26.

Power head 13 is shown with handle bars 34 including handle grips 35 and 36 mounted to support rods 37, only one of which is shown. Support rod 37 is secured to frame 41 and to bracing member 42 which extends from the support rod to a forward shoulder 43 on frame 41 (see FIG. 2).

Wheel 44 is mounted by a suspension means to frame 41. Housing 45 on the end of suspension pivot arm 46 contains a conventional hydraulic motor for driving wheel 44. Arm 46 is pivotally mounted to frame 41 by means of pivot arm 47 which extends across the frame. Shock absorber 51 comprises piston 52 and coaxial spring 53 mounted to tang 54 which is secured to housing 45 and arm 46. The opposite end of the shock absorber comprises rod 57 mounted to forward end 55 of frame 41 by means of a typical bolt arrangement 56.

Engine 61 is mounted to the forward end of frame 41 and may comprise a 7.5 horsepower four cycle gasoline powered, electric start engine as is readily available on the market. Of course, the engine need not have these specific characteristics, but it is preferably a smooth running engine of sufficient horsepower to perform the desired functions. Gas tank 62 is mounted to the top of the engine and rotating cooling apparatus 63 forms the front of the engine. Other details of the apparatus as shown in FIG. 2 will be described in conjunction with FIGS. 3-8.

FIGS. 3 and 4 show details of plates 115 and 116 through which pivot pin 31 extends. Upper plate 115 is welded to rods 37. Reinforcing bar 38 is welded along its lower edge to plate 115 and at its ends to rods 37. A bore therethrough mates with a bore through pin 31 and bolt 39 secures pin 31 to plate 115 and reinforcing bar 38. Similarly, U-shaped reinforcing bar 40 is mounted to the under side of lower plate 116. A bore therethrough aligns with a bore through pivot pin 31 and bolt 49 secures the pin to plate 116. This very strong configuration of the trailer hitch apparatus prevents plates 115 and 116 from spreading apart, a result often occurring in prior art vehicles. The structure also reduces the possibility of enlargement of the holes through which pivot pin 31 passes, an event frequently occurring in prior art devices due to the significant frequent application of torque to the power head caused by starting, stopping and riding over uneven terrain. Reinforcing bars 38 and 40 are about one inch high and ¼ inch thick as seen in FIGS. 2-4. This size has proven to be adequate, but the reinforcing bars may be of any effectual dimensions.

Figure 5:
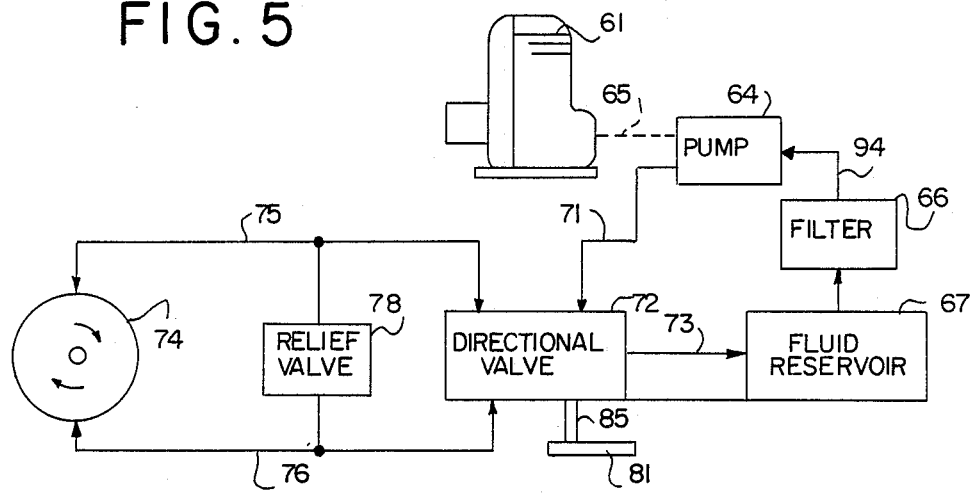
FIG. 5 is a schematic diagram of the power head portion of FIG. 2.

With respect to FIG. 5, engine 61 drives pump 64 by mechanical means represented by dotted line 65. The pump is connected through filter 66 to fluid reservoir 67. The output of pump 64 is connected by means of line 71 to directional valve 72 which in turn has return feed line 73 to the fluid reservoir. The directional valve drives wheel motor 74 in the forward direction through line 75 and in the reverse direction through line 76. Relief valve 78 is provided between lines 75 and 76 and relates to the braking function which will be described hereinbelow. Directional valve 72 is controlled by means of control lever 81 which is connected by means of rod 82 (see FIG. 2) to bracket 83 on rotatable handgrip 35. Lever 81 is pivoted to the valve housing at pivot point 84 and to valve control rod 85 at pivot point 86.

Figure 6:
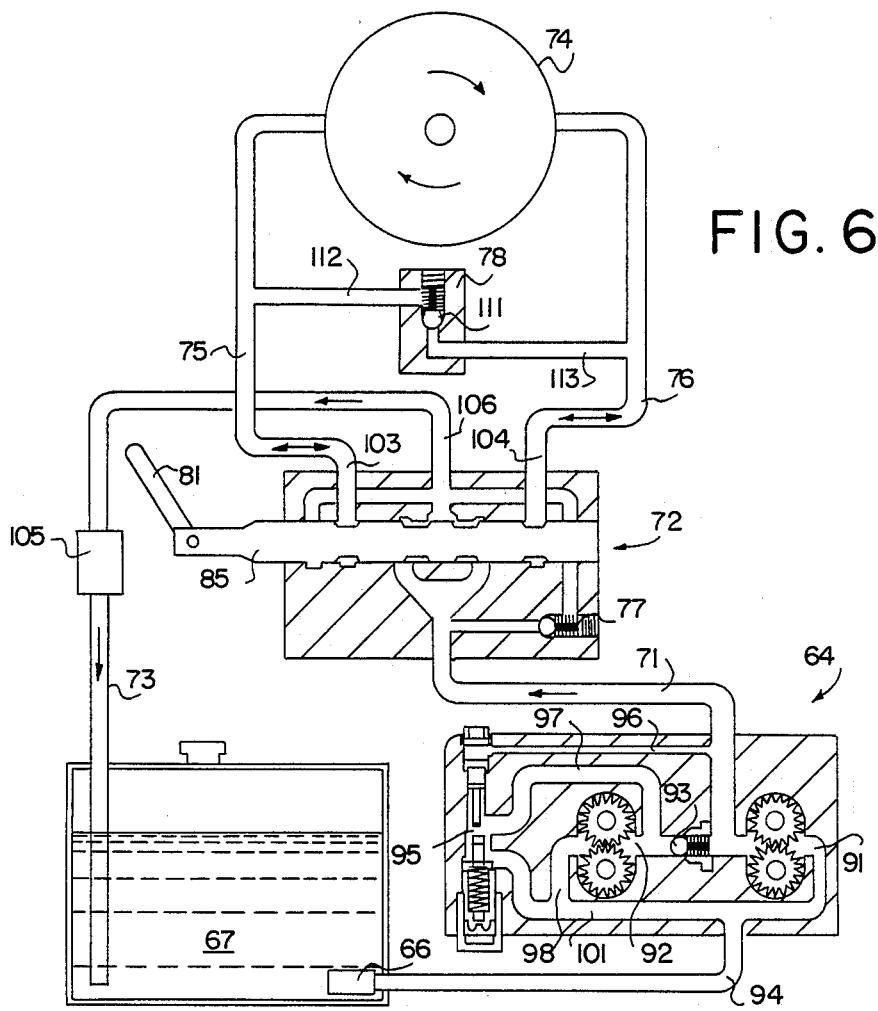
FIG. 6 is a more detailed diagrammatic view of the power head portion of FIG. 5.

The power train shown in FIG. 5 is revealed in more detail in FIG. 6. In this figure, the engine is not shown, so the description will start with pump 64. Preferably, the pump is a gear pump having low volume, high pressure gear section 91 and high volume, low pressure gear section 92. Check valve 93 is positioned between the two gear sections. Fluid from reservoir 67 enters pump 64 through filter 66 and line 94. Depending upon the demand of the wheel motor, the pump will either be operating for high torque as required for going up hills with a load, or lower torque and higher speed when the load on the motor is relatively light. For example, when the pressure in the wheel motor is below 750 psi the pump output is relatively high, for example, 16 gallons per minute. This allows the drive or wheel motor to turn at a relatively high speed, generating an rpm equivalent to about 15 miles per hour. Under higher load conditions, the check valve bypasses the fluid from gear section 92 and uses the pressure only from high pressure gear section 91 to drive wheel motor 74. In this high torque state, the vehicle speed is reduced to about 4 miles per hour. It should be noted that this "downshifting" is done automatically, depending upon the pressure demand on the wheel motor.

A schematic view of the pump of FIG. 6 is shown in FIG. 7. Unloading valve 95 is shown connected to output line 71 by means of pilot pressure line 96. The unloading valve is coupled to the output side of low pressure gear section 92 through line 97 and to the input side of gear section 92 through line 98. The unloading valve also connects to the input side of gear section 91 through line 101.

Directional valve 72 is shown diagrammatically in FIG. 6 and schematically in FIG. 8, with standard nomenclature. As shown, this is a four-way, three-position spool valve. The valve neutral position blocks fluid flow through either of work ports 103 or 104. In this position, the valve and wheel motor combination effectively brake the wheel without the need for disc or caliper brakes on the wheel. When in the neutral position, the fluid from pump 64 is directed back to tank 67 through exhaust port 106 and filter 105 which may be referred to as a "ten micron filter."

When control handle 81 and control rod 85 are moved to the forward position, the valve directs fluid to hydraulic motor 74 through work port 103 and fluid line 75. Fluid passing through the motor, after accomplishing the work therein, leaves through the opposite port and line 76, returning to valve 72 through work port 104. The spool and passages of the directional valve then cause the spent fluid to pass through exhaust port 106, through filter 105 and back to tank 67.

When the control handle is moved to the reverse position, the pressure is applied to the opposite motor port through line 76 from work port 104 of valve 72 and the flow is then reversed back through line 75, valve 72 and out through neutral port 106 and back to reservoir 67.

The power and speed generated in the forward mode is the same as that in the reverse mode. That is, wheel motor 74 is driven equally in either direction, depending upon the direction of incoming fluid flow. In the neutral mode, no power is provided to the wheel and therefore no "creeping" of the vehicle can occur. Relief valve 77 is provided in directional valve 72.

Because of the use of a hydraulic motor and flexible high pressure hoses instead of belts or chains, it is possible to employ suspension of the front drive wheel. The rugged construction of the power head allows for the motor to be supported on only one side, the side shown in FIGS. 1 and 2. Incorporation of suspension means on wheel 44 allows many advantages including operator comfort and less damage and metal fatigue normally associated with the jarring effects of a typical non-suspended vehicle. This allows greater longevity throughout the entire vehicle. Because the motor and wheel must be supported on only one side, changing or repairing tires is accomplished without the removal of an opposite side supporting member which would normally be the case in typical three-wheeled vehicles.

Braking may be accomplished, in addition to hydraulically, through a manual system. When hydraulic braking is used, lever 85 is returned to the neutral position. Due to the construction of valve 72, fluid flow to motor 74 is blocked and cannot either enter or leave the wheel motor. This trapping effect will stop the motor which in turn stops the wheel which is directly attached to the the motor. Because this could provide a severe, jarring stop, an adjustable relief valve 78 is provided between lines 75 and 76. This valve includes spring loaded ball 111 acting as a check valve which allows the fluid trapped in the motor to cross over from the exhaust side to the entering side. This may be referred to as "port relief". Since the motor works like a pump, the pressure needed to open and relieve the check valve is controlled by the force which the wheel exerts on the hydraulic motor. This if the wheel exerts less torque than needed to open the valve, the motor will stop quickly. If the torque exceeds the adjusted spring pressure in the valve, the fluid, normally an oil frequently referred to as hydraulic fluid, will bypass to the opposite side until the torque of the wheel matches the spring pressure. At this point, the wheel will stop.

The relief valve is connected to directional valve 72 through two small lines 112 and 113 connected by means of high pressure lines 75 and 76 to the respective work ports thereof. A release of fluid from one side of the motor to the other side through the relief valve only occurs in the forward travel of the vehicle. When the brake/neutral mode is applied when the motor is turning int he reverse direction, no escape or relief is accomplished because the relief valve acts as a one-way check valve. In this instance, the wheel stops immediately as the main valve is closed. With the relief valve installed in this manner, when reverse torque is applied, the reverse power is only equal to the lower of the settings of relief valve 77 in the directional valve or braking relief valve 78.

Braking may also be accomplished by reversing the direction of flow to the motor, that is, when travelling forward, the handle controlling the directional valve may be put in the reverse position. Thus the pump would exert pressure in the opposite direction on wheel motor 74.

An auxiliary brake may also be incorporated in the vehicle. This is a conventional hand lever operated hydraulic master valve which, when pulled, actuates a hydraulic disc caliper which exerts a clamping action on a disc rotor attached to the wheel hub. For an emergency brake, a valve is installed in the hydraulic fluid line in which, when the handle of the emergency brake lever is actuated, the valve is actuated to trap the fluid in the caliper part of the brake system to retain the clamp effect even when the emergency brake handle is released. The pressure can be released when the brake handle is actuated again and then released.

The engine incorporates a twist grip throttle connected to grip 36 which can be set at any position of operation during initial start with the emergency brake on or with the directional valve in neutral. This can be an aid in starting the engine because it is sometimes necessary to have the engine at half or full throttle to permit a somewhat flooded engine to start. There are times when a cold engine will not start at the idle position. Thus, even though the engine may be at full throttle, there is no power to the wheel motor.

An alternative embodiment of the power train is shown in FIG. 9 where hydrostat 117 controlled by lever 121 attached to rod 122 determines the direction and speed of the fluid applied to wheel motor 74. The engine and fluid reservoir are the same as described in the previous embodiment. A hydrostat is a conventional device, normally a variable displacement piston pump, which can substitute for the pump and directional valve of the first embodiment, but it is relatively more expensive.

While the invention has been described as a complete utility vehicle comprising a power head and a trailer portion, a conventional trailer portion could be coupled to the power head of the invention. Thus the emphasis throughout has been on the details of the power head with the drive means and the suspension of the powered front wheel.

The specific structural elements recited above are examples only and the invention is not limited to the particular sizes and shapes as shown and discussed. It is likely that improvements and modifications will occur to those skilled in the art which are within the scope of the appended claims.

What is claimed is:

1. A utility vehicle comprising:
a trailer head comprising:
a container bed-body;
a pair of wheels; and
first pivotable coupling means at the forward end thereof; and a power head comprising:
a frame;
second pivotable coupling means for detachably connecting said power head to said first pivotable coupling means;
wheel means;
power source means mounted to said frame;

steering means connected to said frame for steering said wheel means;
variable speed pump means coupled to said power source means;
reversible fluid motor means mounted to said wheel means and fluid coupled to said pump means;
control means coupled to said variable speed pump means for controlling the speed and direction of rotation of said reversible fluid motor means; and
suspension means coupling said wheel means to said frame, said suspension means comprising:
an arm pivotably coupled at one end to said frame, said arm having said motor means mounted to the opposite end thereof, said motor means being mounted to said wheel means; and
shock absorber means connected between said frame and said opposite end of said arm.

2. A utility vehicle comprising:
a trailer portion comprising:
a container bed-body;
a pair of wheels; and
first pivotable coupling means at the forward end thereof; and
a power head comprising:
a frame;
second pivotable coupling means for connecting said power head to said first pivotable coupling means;
wheel means;
engine means mounted to said frame;
steering means connected to said frame;
variable speed pump means coupled to said engine means;
fluid motor means coupled between said wheel means and said pump means;
valve means connected to said pump means for controlling the direction of fluid flow to said motor means;
control means connected to said valve means for changing the position thereof; and
suspension means coupling said wheel means to said frame, said suspension means comprising:
an arm pivotable coupled at one end to said frame, said arm having said motor means mounted to the opposite end thereof, said motor means being mounted to said wheel means; and
shock absorber means connected between said frame and said opposite end of said arm.

3. A utility vehicle comprising:
a trailer portion comprising:
a container bed-body;
a pair of wheels; and
first pivotable coupling means at the forward end thereof; and
a power head comprising:
a frame;
second pivotable coupling means for connecting said power head to said first pivotable coupling means;
wheel means;
engine means mounted to said frame;
steering means connected to said frame;
variable speed pump means coupled to said engine means;
fluid motor means coupled between said wheel means and said pump means;
valve means connected to said pump means for controlling the direction of fluid flow to said motor means, said valve means comprising a directional valve having a forward position, a reversed position and a neutral position;
control means connected to said valve means for changing the position thereof;
suspension means coupling said wheel means to said frame;
a forward drive fluid line coupled between said valve and said motor means;
a reverse drive fluid line coupled between said valve and said motor means; and
a relief valve coupled in said forward and said reverse fluid lines so configured as to permit smooth braking of said wheel means when said valve is moved to the neutral position.

4. The utility vehicle recited in claim 3, and further comprising mechanical brakes coupled to said wheel means.

5. A utility vehicle comprising:
a trailer portion comprising:
a container bed-body;
a pair of wheels; and
first pivotable coupling means at the forward end thereof; and
a power head comprising:
a frame;
steering means connected to said frame and comprising handlebars and a pair of spaced rods connecting said handlebars to said frame;
second pivotable coupling means on said frame for connecting said power head to said first pivotable coupling means, said second coupling means comprising:
an upper plate fixed between said rods;
an upper reinforcing bar mounted to said upper plate;
a lower plate fixed between said rods and spaced from said upper plate;
a lower reinforcing bar mounted to said lower plate;
a pivot pin extending through upper and lower plates and through said fist coupling means; and
bolt means connecting said pivot pin to said reinforcing bar;
wheel means;
engine means mounted to said frame;
variable speed pump means coupled to said engine means;
fluid motor means coupled between said wheel means and said pump means;
valve means connected to said pump means for controlling the direction of fluid flow to said motor means;
control means connected to said valve means for changing the position thereof; and
suspension means coupling said wheel means to said frame.

* * * * *